(12) United States Patent
Shan

(10) Patent No.: US 8,620,834 B2
(45) Date of Patent: Dec. 31, 2013

(54) FORECASTING THROUGH TIME DOMAIN ANALYSIS

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 694 days.

(21) Appl. No.: 12/794,150

(22) Filed: Jun. 4, 2010

(65) Prior Publication Data

US 2011/0302112 A1    Dec. 8, 2011

(51) Int. Cl.
*G06F 15/18* (2006.01)
(52) U.S. Cl.
USPC ............................................. 706/12
(58) Field of Classification Search
USPC ............................................. 706/12
See application file for complete search history.

(56) References Cited

U.S. PATENT DOCUMENTS 7,865,389 B2 *    1/2011  Shan ........................... 705/7.29
2009/0024427 A1 *  1/2009  Shan ................................ 705/7

OTHER PUBLICATIONS

Shan et al ("Dynamic Modeling and Forecasting on Enterprise Revenue with Derived Granularities" 2005).*
John Fricks ("Time Series I—Time Domain Methods" 2007).*
Joydeep Bhattacharyya ("Comparison between Time-domain and Frequency-domain Measurement Techniques for Mantle Shear-wave Attenuation" 1998).*
Shan et al ("Services Demand Forecasting and Planning" Jun. 21-24, 2009).*

* cited by examiner

*Primary Examiner* — Lut Wong

(57) ABSTRACT

Embodiments include methods, apparatus, and systems for forecasting using a time domain analysis. One embodiment is a computer implemented method that receives plural cycle lengths identified in time series data and builds a model using a time domain analysis of the time series data. The model is used to predict future events or future data points.

20 Claims, 2 Drawing Sheets

FORECASTING THROUGH TIME DOMAIN ANALYSIS

BACKGROUND

Successful competition in a commercial enterprise often requires careful monitoring of profit margins, sales, deadlines, and many other types of business information. Businesses rely on their latest performance information to support strategic planning and decision making. Businesses without a system for providing accurate and timely forecasts of business information have large disadvantages relative to their competitors.

Accordingly, businesses often use computerized data to forecast events and outcomes, such as end-of-quarter revenue, end-of-month inventory, or end-of-year overhead costs. Forecasts are also used to monitor the probability of achieving some goal to support current business decisions. These tasks are quite challenging to model, especially in large commercial enterprises with large numbers of complex and ongoing transactions.

Some traditional methods forecast events using historical data. Such data often includes cyclic effects that provide valuable information for accurate forecasting. These cyclic effects, however, are difficult to identify, filter, and use for identifying results for analysis and forecasting.

DETAILED DESCRIPTION

Exemplary embodiments are directed to apparatus, systems, and methods for forecasting with automatic cyclic effects identified through a time domain analysis. First, multiple cycles in temporal data are identified through time domain analysis. Then, time series models are built from the data with multiple cyclic effects. The models are used, for example, with forecasting of future events, improving or analyzing quality control in a system, performing data analysis, or using models with other types of decision support systems.

One embodiment automatically identifies the existence of multiple cycles for any temporal data through time domain analysis and identifies the cycle length for each of the cycle effects identified for the temporal data. Outliers in the temporal data are identified, removed, and then replaced. The effects of any particular cycle in the temporal data are also analyzed for aggregation and/or removal.

When modeling with sales data, or any other economic effect impacted data, the data can include one or more cyclic effects or events. For instance, sales data can include the existence of both a quarterly sales effect and a weekly sales effect. Exemplary embodiments are directed to identifying such cyclic effects in data, filtering them layer by layer, and using the identified results for analysis, inference, and forecasting.

By way of illustration, businesses use the knowledge and experience of experts to describe seasonal effects (or in general, cyclic effects) for varying sales activity. For instance, year-end holiday shopping for some businesses provides strong sales performance relative to other times during the year. For other businesses, seasons, holidays, or other factors generate cyclic events, such as sales.

Exemplary embodiments are directed to identifying and quantifying such cyclic effects for both communication and operational purposes. Specifically, embodiments use a time domain analysis (as opposed to a frequency domain analysis) to analyze such cyclic effects and build models used to forecast future events associated with the data.

One exemplary embodiment uses a time domain analysis for identifying, modeling, and using seasonal effects in making forecasts for cyclically behaved temporal data, such as product demand at certain aggregate levels. In the time domain analysis, a serial correlation analysis occurs in the time domain for a time series. The autocorrelation at lag k is defined to be the correlation coefficient between a time series at time point t and at time point t+k. It quantifies how much the values of a time series are correlated at different time intervals. With real world data, one cannot get the autocorrelation function without making distributional assumptions on the data. Nevertheless, one can overpass this distributional assumption stage, and use the sample historical data to generate the sample autocorrelation function.

Figure 1:
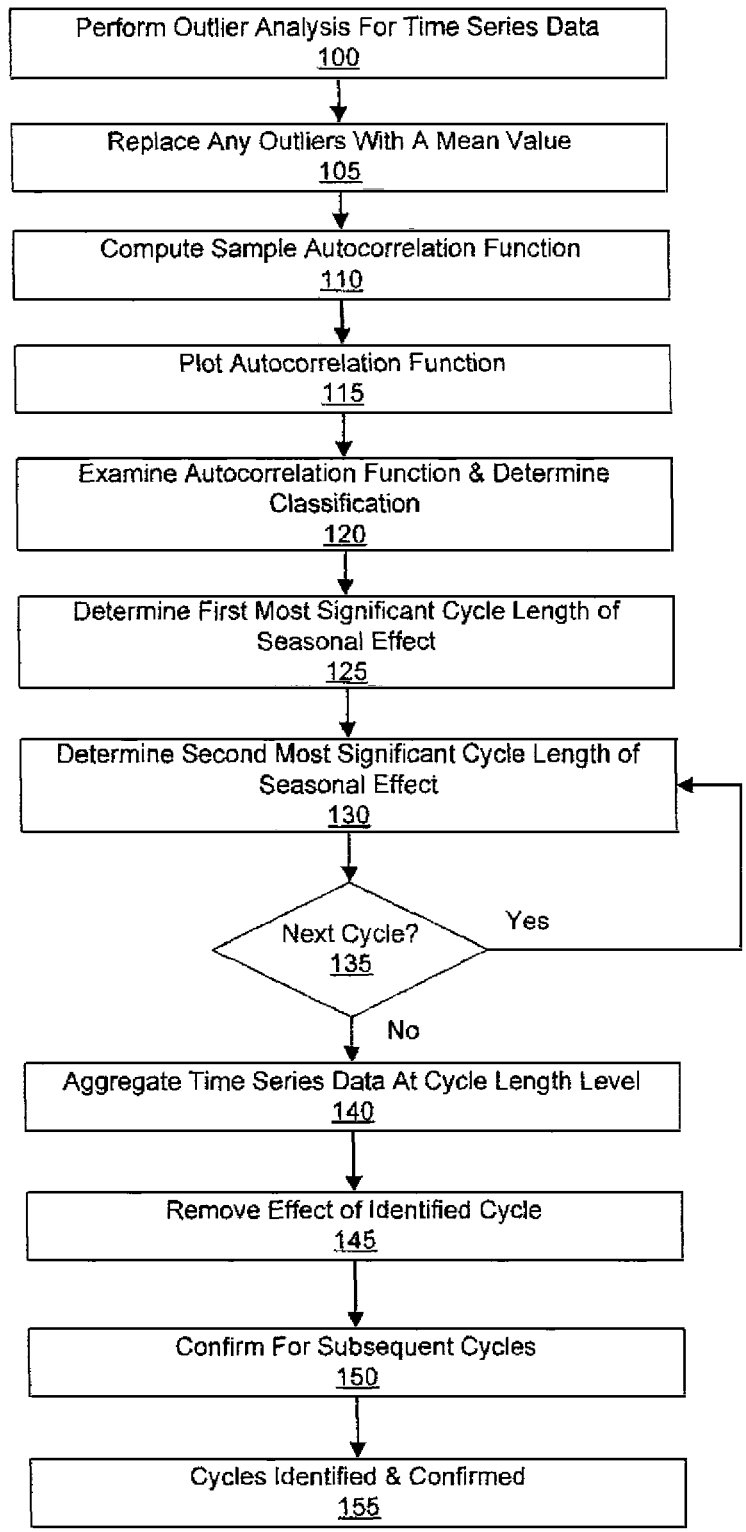
FIG. 1 is a flow diagram for identifying multiple cycles in temporal data through time domain analysis in accordance with an exemplary embodiment.

FIG. 1 is a flow diagram for identifying multiple cycles in temporal data through time domain analysis in accordance with an exemplary embodiment.

According to block 100, an outlier analysis is performed for time series data to identify outliers in the data. For a time series $\{x_t: t=1, 2, \ldots, N\}$, perform an outlier analysis to identify deviations (for example, unusual or infrequent events) in samples or portions of the data.

In one embodiment, the outlier analysis includes performing a stationarity test. Examples of a stationarity test include, but are not limited to, KPSS test (Kwiatkowski, Phillips, Schmidt and Shin, 1992), Runs test, Augmented Dickey-Fuller test, and Phillips-Perron test.

For stationary time series data for which the local mean and local variance are both stable, one embodiment computes the mean and the standard deviation. Points located outside certain multiples of the standard deviation from the mean are identified as outliers. One example for the multiplier would be 3.

For non-stationary time series data, an ARIMA (Auto-Regressive Integrated Moving Average) model is fit through multiple differencing on the original time series in order to get derived stationarity. Once the model is determined to fit the data properly, one exemplary embodiment computes the residual time series (i.e., the difference between the original time series and the fitted time series).

According to block 105, discovered outliers are replaced with a mean value. The mean value can be taken either locally or globally. For notational convenience, the new time series is denoted by $\{x_t: t=1, 2, \ldots, N\}$. Blocks 100 and 105 are optional if outliers are deemed non-existent with data quality assurance or other operational efficiency consideration.

According to block 110, a sample autocorrelation function is computed for the data. In one embodiment, the sample autocorrelation function is computed with the following formulas:

$$r_k = \frac{c_k}{c_0}, \text{ where } c_k =$$

$$\frac{1}{N}\sum_{t=1}^{N-1}(x_t - \bar{x})(x_{t+k} - \bar{x}) \text{ for } k = 0, 1, 2, \ldots, (N-1), \text{ and } \bar{x} = \frac{1}{N}\sum_{t=1}^{N}x_t.$$

According to block 115, plot the computed autocorrelation function. One embodiment plots the autocorrelation function, that is $r_k$ versus k for k=0, 1, 2, ..., (N−1).

According to block 120, examine the autocorrelation function and determine a classification. Exemplary embodiments analyze the autocorrelation function through numeric value examination or graphic examination in the plot and determine its classification. Some examples are provided below.

One exemplary embodiment determines if the time series is a random series. For example, one embodiment uses the property that the autocorrelation function would approximately follow a Normal distribution with mean 0 and standard deviation variance $1/\sqrt{N}$, if the time series is a random series.

One exemplary embodiment determines if the time series has short-term correlation. For example, one embodiment uses the property that a stationary series with short-term correlation often have serial correlations characterized by a large value of $r_1$, followed by a few subsequent $r_k$ values that tend to get successively smaller while above zero.

One exemplary embodiment determines if the time series is an alternating one. For example, one embodiment uses the fact that if a time series alternates with successive observations on different sides of the overall mean, then the correlation function alternates the same way.

One exemplary embodiment determines if the series is non-stationary and has a trend. For example, one embodiment uses the fact that if a time series contains a trend, then the values of the autocorrelation function will not come down to zero except for very large values of the lag.

One exemplary embodiment determines if the series is seasonal. For example, one embodiment uses the fact that if it contains a seasonal fluctuation, the autocorrelation function would also exhibit an oscillation at the same frequency. For example, if there is an annual seasonality for the monthly data, then $r_{12}$ would be large and positive while $r_6$ is large (in absolute value) but negative.

According to block 125, exemplary embodiments determine the first most significant cycle length of seasonal effect. By way of illustration, for a monthly sales time series data set, exemplary embodiments start with the identification of annual seasonal effect. For instance, one embodiment starts with the greatest possible value for a seasonal effect. If $r_{12}$ is significantly larger (i.e., it is above $2/\sqrt{N}$, which is two times the standard deviation $1/\sqrt{N}$ in the approximate distribution), then exemplary embodiments conclude that the annual seasonal effect is significant, which in this case is the largest one.

According to block 130, exemplary embodiments then determine the second most significant cycle length of seasonal effect. This second seasonal effect can be divisible to the largest length identified above. By way of illustration, if an identification is made of the most significant one as the 12 month annual cycle, then the second most significant one would take a lesser value, (for example, a possible value of 6). For instance, implement block 125 and determine if 6 is indeed a significant cycle. If a significant cycle exists, then call it the second most significant cycle of seasonal effect. If not, then continue the process and check if the next divisible number (for example, the number 3) is suitable for the second most significant cycle or seasonal effect.

According to block 135, a question is asked whether to continue and identify further significant cycles. If the answer to this question is "yes" then flow proceeds to block 130 and another significant cycle length of seasonal effect is identified. If the answer to this question is "no" then flow proceeds to block 140. This identification process terminates when the final cycle length is no longer deemed relevant or reaches a user prescribed level.

According to block 140, aggregate the time series data at cycle length levels. For each identified cycle, one exemplary embodiment performs a removal procedure to confirm for the next cycle. Aggregate the time series at the identified cycle length level above the next cycle. For example, suppose we have a daily time series to start with, and we have first identified annual cycle in the data and now we want to check if there is a quarterly cycle. Exemplary embodiments aggregate the daily data by taking the appropriate sample mean or median at the annual level.

According to block 145, remove the effect of the identified cycle by subtracting or dividing the aggregated cycle data from the original time series. Exemplary embodiments perform the subtraction if the effect is deemed additive, and perform the division if multiplicative. For example, assume an additive annual effect already in place, then for all the daily data in the first year, exemplary embodiments subtract the first yearly aggregate data from all the daily data in the first year, and the same procedure goes for the other years.

According to block 150, confirmation is performed for subsequent cycles. After the removal of the effect of the identified cycle, blocks 100 through 130 are performed to confirm for the next and other subsequent cycles.

According to block 155, a stage is reached when a certain number of cycles have been identified and confirmed in the original time series. For example, exemplary embodiments can discover the annual and quarterly cycles in monthly data.

Figure 2:
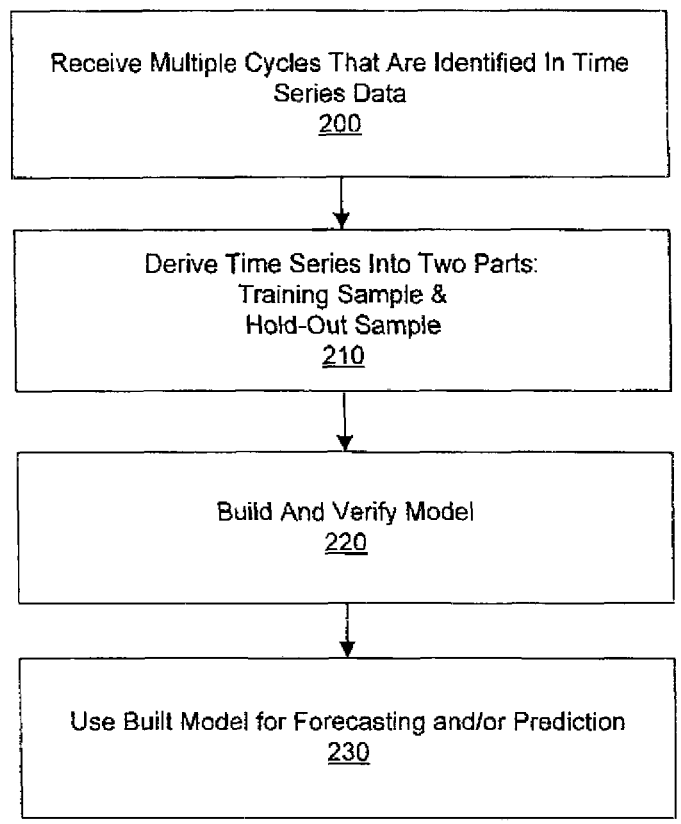
FIG. 2 is a flow diagram for building time series models for forecasting from data with multiple cyclic effects in accordance with an exemplary embodiment.

FIG. 2 is a flow diagram for building time series models for forecasting from time series data with multiple cyclic effects in accordance with an exemplary embodiment.

According to block 200, receive multiple cycles of seasonal effect that are identified in time series data. By way of example, these cycles are identified and confirmed in accordance with the flow diagram of FIG. 1.

According to block 210, the time series is derived or divided into two parts: a training sample part and a hold-out part. For building time series models for prediction purpose, with a given whole historical time series data, first derive the whole time series into the training sample part and the hold-out sample part.

For the training sample, one embodiment performs model estimation, and for the hold-out sample part, one embodiment performs model verification. Thus, one part estimates the model, and the other part verifies the model.

According to block 220, the model is built and verified. Once an initial model is built with the training sample data and is successfully verified with the hold-out sample, one exemplary embodiment extends to include all the available time series data, and rebuilds and calibrates the model parameters including various major cycle lengths.

For building time series models other than prediction purpose, one embodiment uses all the available time series data to build the model, including identifying and quantifying the major cycle effects.

According to block 230, the built model is used for forecasting or prediction, quality control, detection, etc. For example, the quantified cycle effects are fed into a decision support system to predict future events based on known past events or to establish confidence level bounds for future data points before they are actually measured.

Exemplary embodiments in accordance with the invention thus automatically identify the existence of multiple cycles in any temporal data through time domain analysis and automatically identify the cycle length for each of the cycle effects identified in any temporal data. Exemplary embodiments also automatically remove and replace outliers in a temporal data, aggregate the effects of any particular cycle in temporal data, and remove the effects of any particular cycle in temporal data. Further, exemplary embodiments automatically provide quantitative support for decision making process when cycle effects are existent or are suspected to be existent in temporal data.

Figure 3:
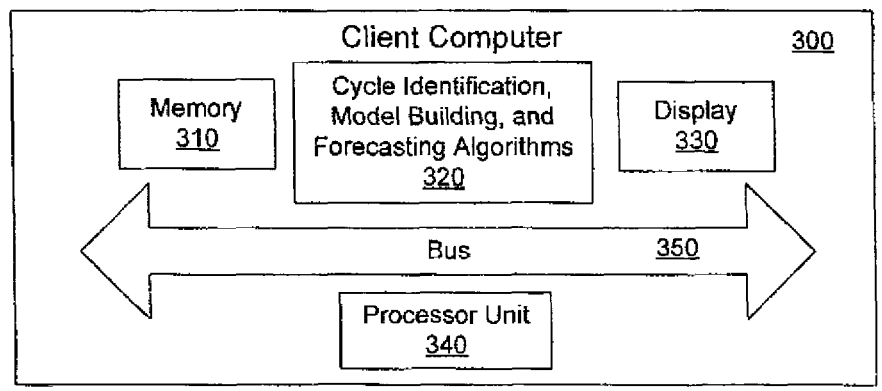
FIG. 3 is a block diagram of a computer for executing methods in accordance with an exemplary embodiment.

FIG. 3 is a block diagram of a client computer, server, or electronic device 300 in accordance with an exemplary embodiment of the present invention. In one embodiment, the computer or electronic device includes memory 310, cycle identification, model building, and forecasting algorithms 320, display 330, processing unit 340, and one or more buses 350.

In one embodiment, the processor unit includes a processor (such as a central processing unit, CPU, microprocessor, application-specific integrated circuit (ASIC), etc.) for controlling the overall operation of memory 310 (such as random access memory (RAM) for temporary data storage, read only memory (ROM) for permanent data storage, and firmware). The processing unit 340 communicates with memory 310 and cycle identification, model building, and forecasting algorithms 320 via one or more buses 350 and performs operations and tasks necessary to identify cycles for temporal data through time domain analysis, build models from time series data with multiple cyclic effects, and used built model for prediction and/or forecasting. The memory 310, for example, stores applications, data, programs, algorithms (including software to implement or assist in implementing embodiments in accordance with the present invention) and other data.

As used herein, an "outlier" is an observation (for example, data) that is numerically distant from the rest of the data or farther away from its expected value. One way to identify outliers is to assume a known distribution for the data and then examine the deviation of observations or samples of data from the distribution. Examples of outlier detection algorithms include distance-based methods, density-based methods, projection-based methods, and distribution-based methods.

As used herein, "autocorrelation" is a tool for analyzing series of values or data and measuring how well the data matches a time-shifted version of itself, as a function of the amount of time shift. Autocorrelation finds repeating patterns in the data. Autocorrelation also describes the correlations in the data at different points in time.

As used herein, a "time series" is a sequence of data points or single typed measurements that are measured at successive times spaced at time intervals. Further, the term "time series analysis" is a method that analyzes time series to understand an underlying theory of the data points or make forecasts (i.e., predictions). Thus, a forecast or prediction based on time series data uses a model to predict future events based on known past events or to predict future data points before they are actually measured.

As used herein, "time domain" describes the analysis of mathematical functions, signals, or data with respect to time. In the time domain, the signal or functions value is known for real numbers for continuous time or at various separate instances in the case of discrete time. By contrast, the term "frequency domain" describes the analysis of mathematical functions, signals, or data with respect to frequency. By way of example, a time domain graph shows how a signal changes over time, and a frequency domain graph shows how much of the signal is within each given frequency band over a range of frequencies. As another example and as discussed herein, exemplary embodiments in accordance with the invention utilize a time domain analysis (as opposed to a frequency domain analysis) to identify and model seasonal effects in making forecasts for cyclically behaved temporal data.

As used herein, "temporal" means of or relating to time.

As used herein, "ARIMA" (autoregressive integrated moving average) is a model fitted to time series data either to better understand the data or predict future points in the series. The model refers to an ARIMA (p, d, q) model where p, d, and q are integers greater than or equal to zero and refer to the order of the autoregressive, integrated, and moving average parts of the model respectively.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer implemented method using a computing device with a processor and memory having instructions stored thereon which are executed by the processor to perform a method, comprising:
   receiving, via a communication link, multiple cycle lengths from a combination of cycles of seasonal effects that are identified in time series data;
   using a time domain analysis of the time series data to build a model; and
   using the model to predict future events or future data points.

2. The method of claim 1 further comprising:
   building an initial model from training sample data;
   calibrating the model to include the multiple cycle lengths of seasonal effect.

3. The method of claim 1 further comprising, dividing the time series data into a first part for estimating the model and a second part for verifying the model.

4. The method of claim 1 further comprising, continuing to identify multiple cycle lengths of seasonal effects in the time series data until a final cycle length is deemed not relevant or reaches a user prescribed level.

5. The method of claim 1 further comprising, aggregating the multiple cycle lengths of seasonal effect.

6. The method of claim 1 further comprising, subtracting or dividing aggregated cycle data from the time series data to remove an effect of an identified cycle to confirm a next cycle.

7. The method of claim 1 further comprising, using the model for one of forecasting future events, performing data analysis, and analyzing quality control in a system.

8. A non-transitory computer readable medium having instructions stored thereon which are executed by a processor to perform a method, comprising:
   identifying a combination of cycles in temporal data through a time domain analysis;
   building a model from the identified cycles in the temporal data; and
   using the model to predict future events or future data points.

9. The computer readable medium of claim 8 further comprising, performing an outlier analysis to identify deviations in the temporal data.

10. The computer readable medium of claim 8 further comprising, performing a stationary test on the temporal data.

11. The computer readable medium of claim 8 further comprising, replacing outliers discovered in the temporal data with a mean value.

12. The computer readable medium of claim 8 further comprising, computing a sample autocorrelation function to determine correlations in the temporal data at different points in time.

13. The computer readable medium of claim 8 further comprising, identifying cycle lengths of seasonal effect in the temporal data.

14. The computer readable medium of claim 8 further comprising, determining if the temporal data is non-stationary and has a trend.

15. The computer readable medium of claim 8 further comprising, using the model to model sales data to perform one of identifying cyclic effects in the sales data, identifying quarterly sales effect, or filtering the sales data.

16. A computer, comprising:
   a processor;
   a memory coupled to the processor; and
   computer executable instructions stored on the memory and executed by the processor to:
      receive plural cycle lengths from a combination of cycles of seasonal effects that are identified in time series data;
      build a model using a time domain analysis of the time series data; and
      use the model to predict future events or future data points.

17. The computer of claim 16, wherein the processor further executes the instructions to:
   compute an autocorrelation function for the time series data; and
   determine if the autocorrelation function follows a normal distribution.

18. The computer of claim 16, wherein the processor further executes the instructions to determine if the time series data is a random series.

19. The computer of claim 16, wherein the processor further executes the instructions to determine if the time series data alternates with successive observations on different sides of a mean.

20. The computer of claim 16, wherein the processor further executes the instructions to use the model to model sales data to perform one of identifying cyclic effects in the sales data, identifying quarterly sales effect, or filtering the sales data.

* * * * *